United States Patent [19]

Sato

[11] Patent Number: 4,983,029
[45] Date of Patent: Jan. 8, 1991

[54] EYEGLASS FRAME HAVING TI-NI-V ALLOY ELEMENT WITH IMPROVED WEAR COMFORTABILITY

[75] Inventor: Shoichi Sato, Miyagi, Japan

[73] Assignees: Tokin Corporation, Miyagi; Nakanishi Optical Corporation, Osaka, both of Japan

[21] Appl. No.: 341,119

[22] Filed: Apr. 20, 1989

[30] Foreign Application Priority Data

Apr. 21, 1988 [JP] Japan ................................. 63-96737

[51] Int. Cl.$^5$ .......................... G02C 5/14; G02C 5/02
[52] U.S. Cl. ..................................... 351/41; 351/111; 351/124
[58] Field of Search ................... 351/41, 111, 124, 140

[56] References Cited

FOREIGN PATENT DOCUMENTS

| 34743 | 3/1976 | Japan | 351/41 |
| 45124 | 5/1984 | Japan | 351/41 |
| 151823 | 7/1987 | Japan | 351/41 |

Primary Examiner—Rodney B. Bovernick
Attorney, Agent, or Firm—Hopgood, Calimafde, Kalil, Blaustein & Judlowe

[57] ABSTRACT

In an eyeglass frame comprising a pair of lens fixing rims, a bridge connecting the paired rims, and a pair of temples, the bridge and/or the temples are made of Ti-Ni-V alloy having a super elasticity of a generally rectangular stress-strain hysteresis loop over a relevant temperature range of 0°-20° C. so as to improve eyeglass wearing comfortability. The Ti-Ni-V alloy comprises Ni and Ti with an atomic ratio Ni/Ti of 1.02-1.06 and V 0.25-2.0 at. %, and is worked into a desired shape and thereafter is heat-treated at 425°-525° C. for 10-60 minutes.

6 Claims, 4 Drawing Sheets

EYEGLASS FRAME HAVING TI-NI-V ALLOY ELEMENT WITH IMPROVED WEAR COMFORTABILITY

BACKGROUND OF THE INVENTION

1. Field of the Invention

The present invention relates to eyeglass frame and, in particular, such frames using Ti-Ni alloy elements.

2. Description of the Prior Art

U.S. Pat. No. 4,772,112 issued to Zider et al. and assigned to CVI/Beta Ventures, Inc. discloses to use a shape memory alloy such as Ti-Ni alloy for elements in the eyeglass frame.

It is well known in the art that the Ti-Ni shape memory alloy has a super elasticity or a pseudo elasticity as well as the shape memory effect. The reference 1 proposes to use, as an optimized elasticity, a combination of a super elasticity as shown in FIG. 2f and a work-hardened pseudo elasticity of FIG. 2h in the Reference.

The stress-strain curve according to the optimized elasticity has a comparatively small hysteresis loop and the strain variation is almost in propotion to variation of the stress. Although the reference recommends utilization of the optimized elasticity for the eyeglass frame, it has been confirmed by the present inventor that the super or pseudo elasticity having a generally rectangular hysteresis is more relevant for the eyeglass frame elements such as bridges and temples.

Although the conventional Ti-Ni shape memory alloy has the stress-strain curve of the rectangular hysteresis loop as shown in FIG. 2c in the reference, the curve is realized only a limited temperature range which is smaller than a broad relevant temperature range such as 0°–20° C. Therefore, the Reference abandon utilization of the pseudo elasticity having the generally rectangular hysteresis for the eyeglass frame elements.

SUMMARY OF THE INVENTION

It is an object of the invention to provide an eyeglass frame using a Ti-Ni alloy having a super or pseudo elasticity characterized by a stress-strain curve of the rectangular hysteresis loop so as to improve wearing comfortability of the eyeglass frame over a relevant temperature range including 0°–20° C.

The present invention is directed to an eyeglass frame comprising bridge means connecting a pair of lens fixing rims and temples connected to the rims, respectively. According to the present invention, at least one element of the bridge means and the temples is made of Ti-NI-V alloy having a super elasticity over a temperature range including a relevant range of 0°–20° C. The Ti-Ni-V alloy comprises V 0.25–2.0 at. % and the balance of Ni and Ti with an atomic ratio Ni/Ti of 1.02–1.06. The super elasticity is characterized by a stress-strain curve having a generally rectangular hysteresis loop wherein strain gradually increases with increase of stress and rapidly and suddenly increases at an elevated stress while strain gradually reduces with reduction of stress and rapidly and suddenly reduces at a reduced stress.

In production, the at least one element of said Ti-Ni-V alloy is cold worked into a shape and then heat treated at 425°–525° C. for 10–60 minutes.

BRIEF DESCRIPTION OF THE DRAWINGS

FIGS. 3(a)–4(f) are cited from JP-A-64-14834, FIGS. 3(a)–3(f) show stress-strain curves of sample wires of alloy No. 6 heat treated at different temperatures which were measured at different temperatures;

FIGS. 4(a)–4(f) show stress-strain curves of sample wires of alloy No. 15 heat treated at different temperatures which were measured at different temperatures;

DESCRIPTION OF PREFERRED EMBODIMENTS

Figure 1:
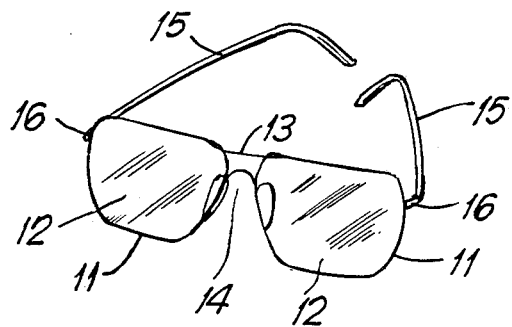
FIG. 1 is a perspective view of an eyeglass using a frame according to an embodiment of the present invention.

Referring to FIG. 1, an eyeglass frame according to an embodiment of the present invention comprises a pair of rims 11 for supporting lenses 12, a reinforcing bridge 13 connecting tops of the paired rims 11 and a nose bridge 14 connecting opposite sides of the paired rims 11, and a pair of temples 15 connected to rims 11 by hinges 16, respectively.

Each of the temples 15 is made of a Ti-Ni-V alloy which comprises V of 0.25–2.0 atomic percent and the balance of Ti and Ni with an atomic ratio Ni/Ti of 1.02–1.06.

The Ti-Ni-V alloy was proposed by Yamauchi in JP-A-64-14834 (which is corresponding to a copending U.S. patent application Ser. No. 142,672 and is now U.S. Pat. No. 4,894,100 assinged to Tohoku Kinzoku Kogyo K. K. having an English name of Tokin Corporation). Examples of the Ti-Ni-V alloy will be described below.

Alloy ingots containing ingredients shown in Table 1 were prepared by use of a high frequency induction vacuum furnace.

TABLE 1

| Alloy No. | Ingredients (at %) | | | Cold Workability |
|---|---|---|---|---|
| | Ti | Ni | V | |
| 1 | 49 | 50.75 | 0.25 | Good |
| 2 | 49 | 50.50 | 0.50 | Good |
| 3 | 49 | 50.0 | 1.0 | Good |
| 4 | 49 | 48.5 | 2.5 | Impossible |
| 5 | 48.875 | 50.875 | 0.25 | Good |
| 6 | 48.75 | 50.75 | 0.50 | Good |
| 7 | 48.50 | 50.50 | 1.0 | Good |
| 8 | 47.75 | 49.75 | 2.5 | Impossible |
| 9 | 47.0 | 49.0 | 4.0 | Impossible |
| 10 | 46.5 | 48.5 | 5.0 | Impossible |
| 11 | 48.75 | 51.0 | 0.25 | Good |
| 12 | 48.50 | 51.0 | 0.50 | Difficult |
| 13 | 48.0 | 51.0 | 1.0 | Impossible |
| 14 | 46.5 | 51.0 | 2.5 | Impossible |
| 15 | 49 | 51 | — | Good |

Figure 2:
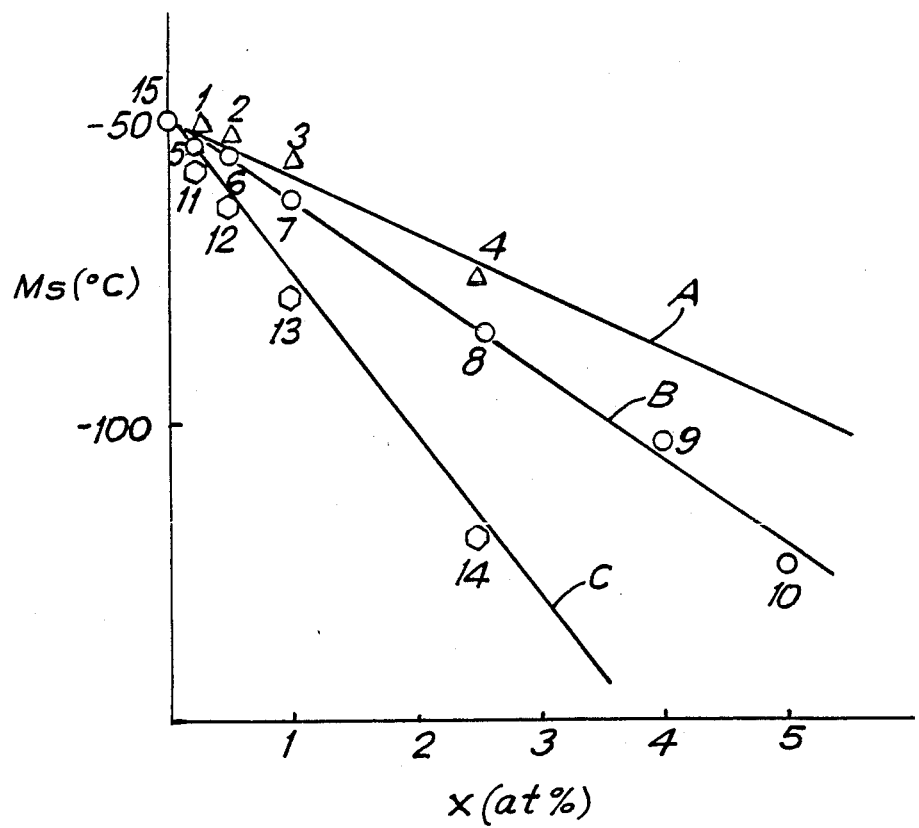
FIG. 2 is a plot showing the relationship between the martensitic transition start point (m.s.) to x set forth in AT %.
Figure 3A:
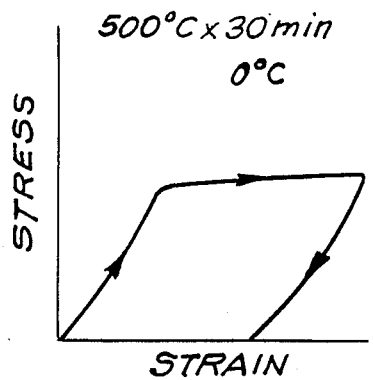
Figure 3B:
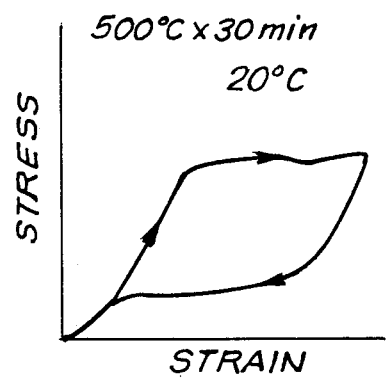
Figure 3C:
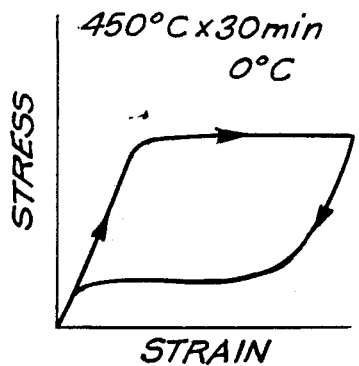
Figure 3D:
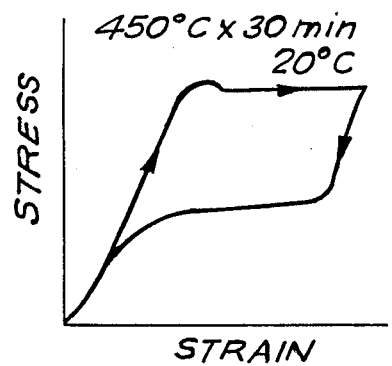
Figure 3E:
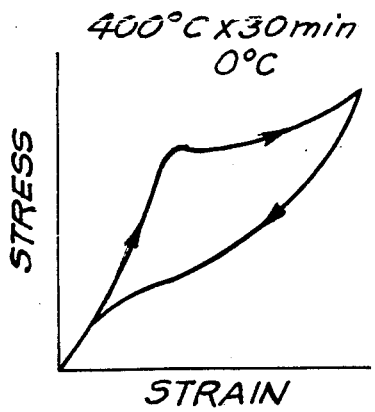
Figure 3F:
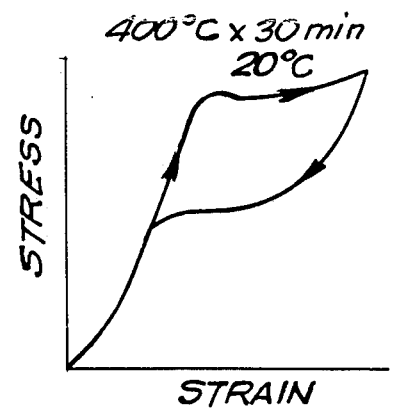
Figure 4A:
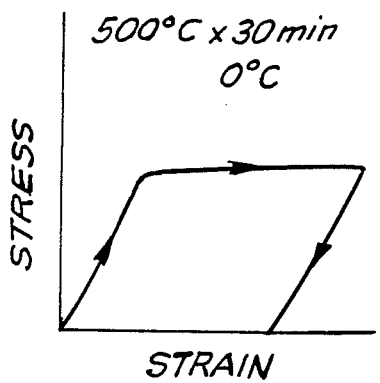
Figure 4B:
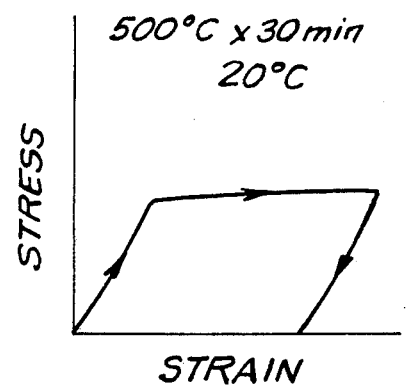
Figure 4C:
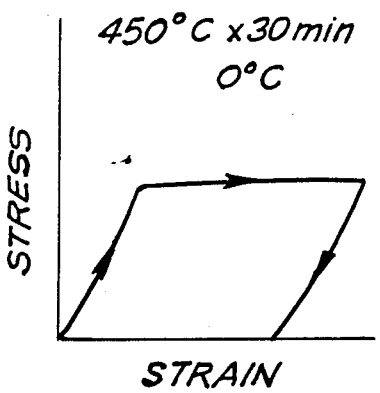
Figure 4D:
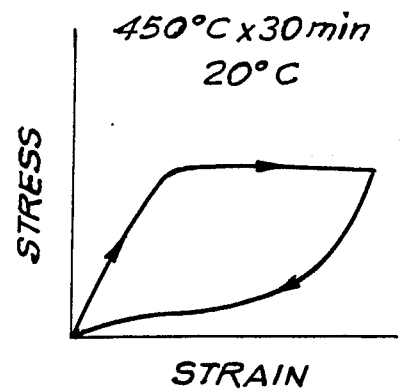
Figure 4E:
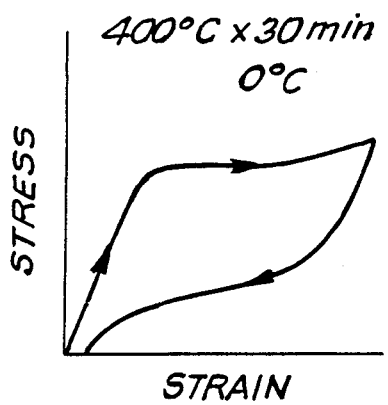
Figure 4F:
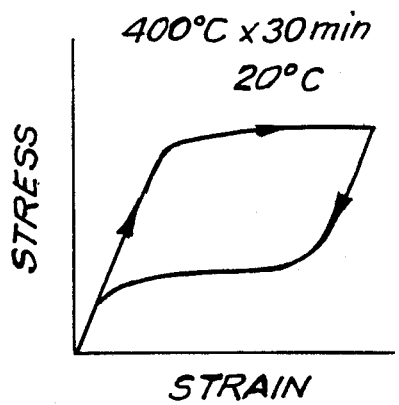

Alloy ingots of Nos. 1–15 were heat treated at 750° C. for one hour and their martensitic transition start points (Ms) were measured by use of a differential scanning calorimeter. The measured Ms are plotted with the alloy numbers in FIG. 2 in connection with V amount x. Nos. 1–4 alloys are represented by a formula of $Ti_{49-x}Ni_{51-x}V_x$ and are on a line A. Nos. 5–9 alloys are represented by another formula of $Ti_{49-x/2}Ni_{51-x/2}V_x$ and are on another line B. The other alloys Nos. 11–14 are represented by a formula of $Ti_{49-x}Ni_{51}V_x$ and are on a line C. FIG. 2 teaches us that addition of V shifts Ms to a lower temperature.

On the other hand, those prepared ingots were subjected to a solution heat treatment. Then, the treated ingots were worked into wires having a diameter of 1.3 mm, respectively, through hot hammering, hot rolling and cold wire drawing processes. Thereafter, the wires were further subjected through no annealing to another cold wire drawing to form sample wires having a diameter of 1.0 mm, respectively.

It was impossible to cold work Nos. 4, 8–10, 13, and 14 alloys, as described in Table 1. Accordingly, sample wires of these alloys were not obtained. Although No. 12 alloy was difficult in cold working, sample wires were obtained.

The obtained sample wires of each alloy were heat treated for 30 minutes at different temperatures, that is, 400° C., 450° C., and 500° C., respectively. Tensile tests of the heat-treated sample wires were run at different temperatures within a temperature range from −20° C. to 50° C. The stress was loaded to make a strain of 5% and then unloaded to zero.

The measured stress-to-strain curves of sample wires of Nos. 6 and 15 are representatively demonstrated in FIGS. 3(a)–3(f) and FIGS. 4(a)–4(f), respectively. FIGS. 3(a), 3(b), 4(a), and 4(b) are for samples heat treated at 500° C. FIGS. 3(c), 3(d), 4(c), and 4(d) are for samples heat treated at 450° C. FIGS. 3(e), 3(f), 4(e), and 4(f) are for samples heat treated at 400° C. FIGS. 3(a), 3(c), 3(e), 4(a), 4(c), and 4(e) are for samples measured at 0° C. and FIGS. 3(b), 3(d), 3(f), 4(b), 4(d), and 4(f) are for samples measured at 20° C.

Sample wires of alloy No. 6 all exhibit an excellent pseudo elasticity at 20° C., and some of the sample wires which were heated at 400° C. and 450° C. has also an excellent pseudo elasticity even at 0° C. On the other hand, samples of No. 15 alloy containing no vanadium do not exhibit the pseudo elasticity at 0° C., at all, and a sample heated at 500° C. has no pseudo elasticity even at 20° C.

Figure 5:
FIG. 5 is a perspective view of a temple piece.

In order to produce a temple 15 of the Ti-Ni-V alloy, the alloy ingot is prepared by use of high frequency induction melting in vacuum. The ingot is solution treated at 900° C. for 2 hours and is worked to a wire having a diameter of 1.4 mm by hot hammering, hot rolling and cold drawing. Thereafter, it is cold worked to have a diameter of 1.2 mm without annealing and a portion of it is annealed at 750° C. for 10 minutes and thereafter, is rolled to have a thickness of 1.0 mm to obtain a temple piece 15' having a shape shown in FIG. 5. The obtained temple piece 15' is treated at 425° C. for 15 minutes and is polished to make a temple 15 having a metallic brilliance.

Figure 6:
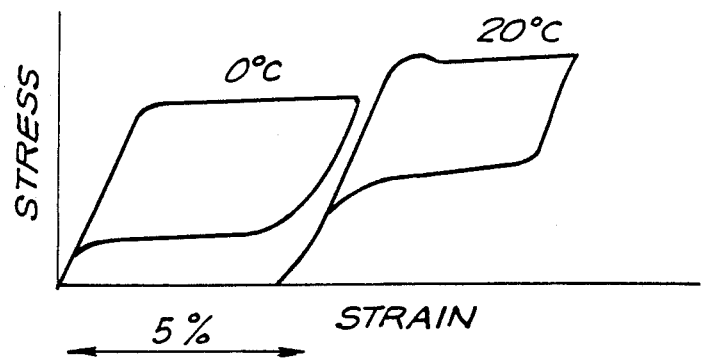
FIG. 6 is a stress-strain curve of the temple piece of sample alloy No. 2.
Figure 7:
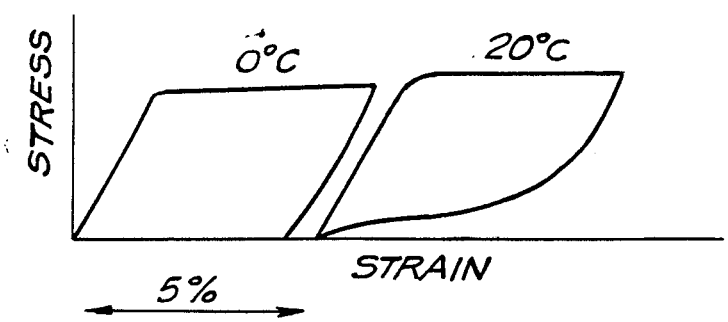
FIG. 7 is a stress-strain curve of the temple piece of sample alloy No. 15.

A part of the temple piece 15' is cut out and is subjected to a tensile test at 0° C. and 20° C. The resultant stress-strain curve is shown in FIG. 6 with respect to sample Alloy No. 2 in Table 1. A comparative alloy of Ti-51 at % Ni (sample No. 15 in table 1) is worked in the similar manner and is subjected to the similar tensile test. The resultant stress-strain curve is also shown in FIG. 7. FIG. 6 shows that the super elasticity having the stress-strain curve of a rectangular hysteresis loop is obtained even at 0° C. similar to sample alloy No. 6 in Table 1 (FIGS. 3(c) and 3(d)) where strain returns to the initial value at a moment when stress is removed, but FIG. 7 shows the super elasticity is only present at 20° C. Therefore, the temple 15 of the embodiment is preferable in the super elasticity.

Figure 8A:
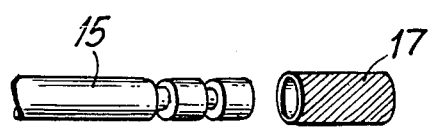
FIGS. 8a and 8b are perspective views illustrating the temple and a cap before and after they are connected.
Figure 8B:

To an end of the produced temple 15, a cap 17 is fitted and mechanically fixed which is made of metal such as stainless steel having good soldering property, and thereafter, is joined by the soldering, as shown in FIG. 8. The cap 17 is for connecting the temple 15 to the hinge 16.

Figure 9:
FIG. 9 is a perspective view of a reinforcing bridge according to the present invention.
Figure 10:
FIG. 10 is a perspective view of a nose bridge according to the present invention.

Although the above description has been made as to temple 15, application is similarly made to the bridges 13 and 14 with a similar advantage. FIG. 9 shows a shape of a bridge piece for producing the reinforcing bridge 13 and FIG. 10 shows a shape of a nose bridge piece for producing a nose bridge 14.

The rim 11 can also be produced in a manner as the temple 15 as described above.

What is claimed is:

1. In an eyeglass frame comprising bridge means connecting a pair of lens fixing rims and temples connected to the rims, respectively, the improvement wherein at least one element of said bridge means and said temples is made of Ti-NI-V alloy having a super elasticity over a temperature range including a relevant range of 0°–20° C., said Ti-Ni-V alloy comprising V 0.25–2.0 at. % and the balance of Ni and Ti with an atomic ratio Ni/Ti of 1.02–1.06, said super elasticity being characterized by a stress-strain curve having a generally rectangular hysteresis loop wherein strain gradually increases with increase of stress and rapidly and suddenly increases at an elevated stress while strain gradually reduces with reduction of stress and rapidly and suddenly reduces at an reduced stress.

2. An eyeglass frame as claimed in claim 1, wherein said bridge means comprises a nose bridge portion connecting opposite side portions of said paired rims to each other and a reinforcing bridge portion connecting top portions of said paired rims to each other.

3. An eyeglass frame as claimed in claim 1, wherein said at least one element of said Ti-Ni-V alloy is one which has been cold worked into a shape and then heat treated at 425°–525° C. for 10–60 minutes.

4. An eyeglass frame as claimed in claim 1, wherein said Ti-Ni-V alloy is one represented by $Ti_{49-x}Ni_{51}V_x$ ($0.25 \leq X \leq 0.50$).

5. An eyeglass frame as claimed in claim 1, wherein said Ti-Ni-V alloy is one represented by $Ti_{49-x/2}Ni_{51-x/2}V_x$ ($0.25 \leq X \leq 2.0$).

6. An eyeglass frame as claimed in claim 1, wherein said Ti-Ni-V alloy is one represented by $Ti_{49}Ni_{51-x}V_x$ ($0.25 \leq X \leq 2.0$).

* * * * *